(12) United States Patent
Andersson et al.

(10) Patent No.: US 8,036,694 B2
(45) Date of Patent: Oct. 11, 2011

(54) METHOD AND DEVICE FOR POWER CONTROL IN A WIRELESS COMMUNICATION SYSTEM

(75) Inventors: Lennart Andersson, Hjärnarp (SE); Johan Nilsson, Höllviken (SE); Bengt Lindoff, Bjärred (SE); Bo Bernhardsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 453 days.

(21) Appl. No.: 11/721,795

(22) PCT Filed: Dec. 19, 2005

(86) PCT No.: PCT/EP2005/013646
§ 371 (c)(1),
(2), (4) Date: Oct. 1, 2009

(87) PCT Pub. No.: WO2006/066843
PCT Pub. Date: Jun. 29, 2006

(65) Prior Publication Data
US 2010/0016009 A1 Jan. 21, 2010

Related U.S. Application Data

(60) Provisional application No. 60/650,634, filed on Feb. 7, 2005.

(30) Foreign Application Priority Data

Dec. 20, 2004 (EP) .................................... 04030131

(51) Int. Cl.
*H04B 7/00* (2006.01)
(52) U.S. Cl. ...................................................... 455/522
(58) Field of Classification Search .................. 455/522
See application file for complete search history.

(56) References Cited

U.S. PATENT DOCUMENTS

2002/0187802 A1  12/2002  Agin et al.
2004/0157633 A1*  8/2004  Ogura .......................... 455/522

FOREIGN PATENT DOCUMENTS

CN  1401164 A  3/2003

(Continued)

OTHER PUBLICATIONS

3GPP Technical Specification TS 25.214 V6.4.0 (Dec. 2004) Technical Specification Group Radio Access Network; Physical layer procedures (FDD) Release 6, Section 5.

(Continued)

*Primary Examiner* — Duc Nguyen
*Assistant Examiner* — Ankur Jain
(74) *Attorney, Agent, or Firm* — Potomac Patent Group PLLC

(57) ABSTRACT

A method for generating a power control command in a transceiver in a wireless communication system, where the method comprises the steps of calculating, at the beginning of a predefined time period, a quality measure reference value, generating, repeatedly during the predefined time period, an estimated quality measure value of a signal received at the transceiver; generating a power control command in dependence of the estimated quality measure value and the quality measure reference value; and generating, a number of times during the predefined time period, a modified quality measure reference value from the quality measure reference value. The step of generating the power control command comprises comparing the estimated quality measure value with the modified quality measure reference value. A power control unit, comprising a quality measure estimator, a calculator, a first controller, a second controller and an inner loop element, is configured to implement the method.

32 Claims, 6 Drawing Sheets

FOREIGN PATENT DOCUMENTS

| | | |
|---|---|---|
| EP | 1248388 A1 | 10/2002 |
| WO | 01/20808 A | 3/2001 |
| WO | 03/055098 A1 | 7/2003 |

OTHER PUBLICATIONS

PCT International Search Report, mailed Jun. 6, 2006, in connection with International Application No. PCT/EP2005/013646.

PCT International Preliminary Report on Patentability, mailed Jan. 24, 2007, in connection with International Application No. PCT/EP2005/013646.

Chinese Office Action, dated Mar. 29, 2010, in connection with Chinese Invention No. 200580048207.5.

Translation of Chinese Office Action, dated May 6, 2010, in connection with Chinese Invention No. 20058004807.5.

* cited by examiner

METHOD AND DEVICE FOR POWER CONTROL IN A WIRELESS COMMUNICATION SYSTEM

CROSS-REFERENCE TO RELATED APPLICATIONS

This application claims the benefit of U.S. Provisional Application No. 60/650,634 filed Feb. 7, 2005, which is hereby incorporated herein by reference in its entirety. This application also claims priority under 35 U.S.C. §119 to European Patent Application No. 0403131.9 filed Dec. 20, 2004, which is hereby incorporated herein by reference in its entirety.

TECHNICAL FIELD

The present invention relates to a method for generating a power control command in a transceiver in a wireless communication system. The invention also relates to a power control unit and a computer readable medium configured to implement the method and a wireless communication transceiver comprising the power control unit. The present invention further relates to a method for controlling a power level of signals transmitted in a wireless communication system to a first transceiver from a second transceiver.

DESCRIPTION OF RELATED ART

In wireless communications systems the transmission channel between a transmitter in a transceiver and a receiver in another transceiver is formed by a radio link. As an example, the transmitter could be included in a base station, and the receiver could be included in a user equipment, such as a mobile station (for the downlink transmission direction), or vice versa (for the uplink transmission direction).

Power control in wireless communications systems is employed to compensate for variations in the channel (such as propagation delays and fading effects) and to ensure that an acceptable transmission quality for all users in the system is maintained.

Multipath fading is due to reflections of a propagating radio signal sent from a transmitter to a receiver. It could cause a power level of a received signal to vary very rapidly with deep fading dips now and then. To compensate for this effect, a closed power control loop is typically used.

In many wireless communication systems, such as WCDMA (Wideband Code Division Multiple Access), power is the most important resource since different users on different channels are transmitting simultaneously on the same radio frequency. It is therefore important to keep the transmitted power level on each channel as low as possible, while maintaining an acceptable performance quality at the receiver. Also, in WCDMA, the "near-far" problem needs to be minimized. Near-far refers to the ratio of signal strength from a mobile station close to a base station to a mobile station far away from the base station, which needs to be as close to unity as possible (i.e. the base station needs to receive signal power of the same order from all mobile stations irrespective of their distance from the base station, to avoid one user blocking the others).

The solution is typically a closed power control loop which adjusts the transmitted power in order to maintain a received and estimated Signal-to-Interference Ratio (SIR) value at a given target value (a SIR reference value). In the 3GPP (Third Generation Partnership Project) solution for a WCDMA system specification number 25.214, "Physical layer procedures (FDD)", power control for a WCDMA system is described. The closed power control loop for WCDMA, uplink or downlink, typically comprises elements to form an inner power control loop and an outer power control loop in a receiver of a device in the wireless communication system.

The outer power control loop typically sets the SIR reference value based on a deviation of an estimated block error rate (BLER) value from a BLER reference value. The inner power control loop compares the estimated SIR value to the SIR reference value. Based on this comparison, the inner loop sets a power request, a Transmit Power Control (TPC) command, to be sent to a transmitter of another device in the wireless communication system. The TPC command indicates if a requested change is to increase or to decrease the transmitted power. The outer loop typically operates at a rate much lower than that of the inner loop. For a 3GPP WCDMA system the outer loop operation performs at a rate of 10-100 Hz, whereas the inner loop operation may perform at a rate of 1500 Hz.

In a WCDMA system a number of data bits are typically collected in a transport block and several transport blocks are contained in a Transmission Time Interval (TTI). A transport block comprises a number (1-8) of frames (each 10 ms) transmitted during a TTI. A receiver, in order to decode the data in the transport block, typically needs to receive the complete TTI; and the outer power control loop updates the SIR reference value once every TTI, which is 10-80 ms for the 3GPP WCDMA system.

The actual SIR value will however vary within the TTI, even if the SIR reference value is kept constant within this time. Thus the TPC commands that are produced on a slot-by-slot basis during a TTI may be optimal for the first slot, but non-optimal for the rest of the slots in the same TTI.

The published patent applications WO 03/055098, WO 01/20808 and US 2002/0187802 are examples of prior art documents in the same technical area.

WO 03/055098 describes a power control method, which is complemented with soft information (such as an uncoded bite error rate) estimation and extra regulation for producing a SIR reference based a comparison between the uncoded bit error rate estimate and an uncoded bit error rate reference.

It is a purpose of one or more embodiments of the present invention to provide a method of generating and updating or modifying the SIR reference value several times during a TTI in such a way that the effect of varying SIR values during the TTI is minimized.

SUMMARY

According to one or more embodiments of the invention the above and other problems are solved by a method for generating a power control command in a transceiver (such as a mobile station or a base station) in a wireless communication system. The method comprises the steps of calculating, at the beginning of a predefined time period, a quality measure reference value; generating, repeatedly during the predefined time period, an estimated quality measure value of a signal received at the transceiver; generating a power control command in dependence of the estimated quality measure value and the quality measure reference value; and generating, a number of times during the predefined time period, a modified quality measure reference value from the quality measure reference value. The step of generating the power control command comprises comparing the estimated quality measure value with the modified quality measure reference value.

The step of generating the modified quality measure reference value comprises calculating, at a given point in time during the predefined time period, an effective quality measure value from estimated quality measure values previously generated and generating the modified quality measure reference value in dependence of a difference between the effective quality measure value and said quality measure reference value. The method is thus adjusting the reference value for the quality measure taking the variations in estimated quality measure values into account by generating this effective quality measure value, which corresponds to the quality measure at a certain constant value.

The step of calculating the effective quality measure value may comprise calculating at one or more of a linear average, an exponential average or a logarithmic average from the estimated quality measure values previously generated.

The step of generating the modified quality measure reference value may also comprise setting the modified quality measure reference value to a predetermined threshold value for a remaining time of the predefined time period, where the predefined time period may be divided into a number of sub periods, if the value of the modified quality measure reference value for a next sub period becomes zero or negative. The predetermined threshold value may for example be set to zero.

According to one or more embodiments of the invention a computer readable medium are configured to implement the method for generating a power control command.

According to an alternative embodiment of the invention, there is provided a method for controlling a power level of signals transmitted in a wireless communication system to a first transceiver from a second transceiver. The method comprises the steps of calculating, at the beginning of a predefined time period, a quality measure reference value; generating, repeatedly during the predefined time period, an estimated quality measure value of a signal received at the first transceiver; generating a power control command in dependence of the estimated quality measure value and the quality measure reference value; transmitting the power control command to the second transceiver; adjusting in the second transceiver, in dependence of the power control command, the power levels of signals transmitted to the first transceiver; and generating, a number of times during the predefined time period, a modified quality measure reference value from the quality measure reference value. The step of generating the power control command comprises comparing the estimated quality measure value with the modified quality measure reference value.

The first transceiver may be a mobile station and the second transceiver may be a base station in the wireless communication system, or the first transceiver may be a base station and the second transceiver may be a mobile station.

The step of generating the modified quality measure reference value may comprise calculating, at a given point in time during the predefined time period, an effective quality measure value from estimated quality measure values previously generated and generating the modified quality measure reference value in dependence of a difference between the effective quality measure value and said quality measure reference value.

The method is thus adjusting the reference value for the quality measure taking the variations in estimated quality measure value into account by generating this effective quality measure value, which corresponds to the quality measure at a certain constant value.

Further, the step of calculating the effective quality measure value may comprise calculating one or more of a linear average, an exponential average or a logarithmic average from the estimated quality measure values previously generated.

The step of generating the modified quality measure reference value may also comprise setting the modified quality measure reference value to a predetermined threshold value for a remaining time of the predefined time period, where the predefined time period may be divided into a number of sub periods, if the value of the modified quality measure reference value for a next sub period becomes zero or negative. The predetermined threshold value may for example be set to zero.

In yet an alternative embodiment, there is provided a power control unit in a transceiver (such as a mobile station or a base station) in a wireless communications system. The power control unit comprises a first controller configured to calculate, at the beginning of a predefined time period, a quality measure reference value and a quality measure estimator configured to generate, repeatedly during the predefined time period, an estimated quality measure value of a signal received at the transceiver. The power control unit may also comprise an inner loop element configured to generate a power control command in dependence of the estimated quality measure value and the quality measure reference value. The power control unit may further comprise a second controller configured to generate, a number of times during the predefined time period, a modified quality measure reference value from the quality measure reference value. The inner loop element, which may be a third controller, may be configured to generate the power control command by comparing the estimated quality measure value with the modified quality measure reference value.

The power control unit may further comprise a calculator configured to calculate, at a given point in time during the predefined time period, an effective quality measure value from estimated quality measure values previously generated. The second controller is configured to generate the modified quality measure reference value in dependence of a difference between the effective quality measure value and the said quality measure reference value.

In particular, the calculator may be configured to generate the effective quality measure value by calculating one or more of a linear average, an exponential average or a logarithmic average of the estimated quality measure values previously generated.

Further, the second controller may further be configured to generate the modified quality measure reference value as a predetermined threshold value for a remaining time of the predefined time period, where the predefined time period may be divided into a number of sub periods, if the value of the modified quality measure reference value for a next sub period becomes zero or negative. The predetermined threshold value may for example be set to zero.

The power control unit may further be included in a wireless communication transceiver, which may be a mobile station or a base station.

For the various embodiments, the estimated quality measure value may be an estimated signal-to-interference ratio (SIR) value and the quality measure reference value may be a SIR reference value. The estimated SIR value may be estimated based on received pilot symbols. Similarly, the effective quality measure value may be an effective SIR value and the modified quality measure reference value may be a modified SIR reference value.

Further, for the various embodiments, the predefined time period may be divided into a number of sub periods. Generating the modified quality measure reference value may be done each sub period. More particularly, the predefined time period may be one or more transmission time intervals in a wideband code division multiple access (WCDMA) system and the sub period may be a slot or a fraction of a slot in a WCDMA system.

According to the various embodiments of the invention, the quality measure reference value, such as an SIR reference value, will be adjusted and updated more often than in the prior art solutions, allowing power control commands to be generated more accurately. Hereby a power control system implementing these methods will operate more efficiently and the overall wireless communication system capacity will be increased. In addition, unnecessary power requests from the various users of the wireless communication system may be avoided.

The above features and advantages do not limit the present invention, and those skilled in the art will recognize additional features and advantages upon reading the following detailed description, and upon viewing the accompanying drawings.

BRIEF DESCRIPTION OF THE DRAWINGS

The embodiments of the invention will now be described more fully below with reference to the drawings, in which.

DETAILED DESCRIPTION

Figure 1:
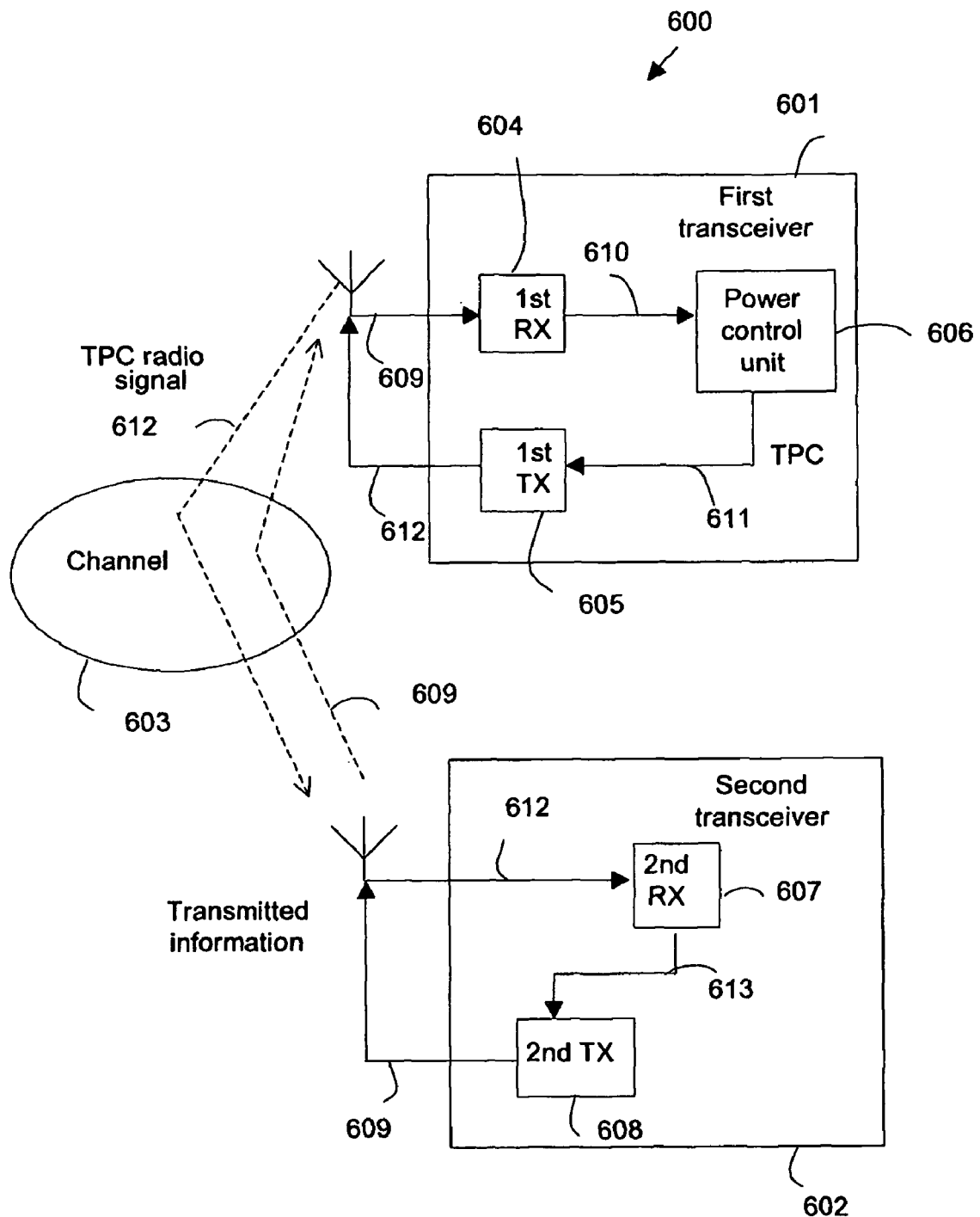
FIG. 1 is an illustration of a power control system employed in a wireless communication system.

FIG. 1 illustrates a power control system 600 operating as a closed power control loop in one direction in a wireless communication system. The power control system 600 comprises at least a first transceiver 601 and a second transceiver 602. They communicate with each other over a wireless transmission channel 603 with radio signals carrying different kinds of information. The first transceiver 601 comprises at least a first receiver 604, at least a first transmitter 605 and at least one power control unit 606, which for example may be the power control unit 100 or 300 to be described below in relation to FIG. 2 and FIG. 4. The second transceiver 602 comprises at least a second receiver 607 and at least a second transmitter 608. If the first transceiver 601 is a base station and/or a radio network controller in the wireless communication system, the power control system 600 is employed for the uplink transmission direction; and vice versa, if the first transceiver 601 is a mobile unit in the mobile communication system, the power control system 600 is employed for the downlink transmission direction. However, the power control system may usefully be employed in both the uplink and the downlink. If so, the uplink scenario the second transceiver would also comprise a second power control unit. However, for the purpose of simplifying the description of the power control system 600, the power control unit 606 is in FIG. 1 only shown in the first transceiver 601. An information signal 609 is transmitted from the second transmitter 608 over the wireless transmission channel 603, which affects the signal in a random and unknown manner before it is received by the first receiver 604. The first receiver 604 processes the signal; by for example amplifying, filtering, frequency downconverting, sampling, despreading, decoding and deinterleaving; and forms a processed received signal 610, which is input to the power control unit 606, which produces the transmit power control (TPC) command 611. The TPC command 611 is processed by the first transmitter 605 to form a radio signal 612 carrying the TPC command for transmission over the wireless transmission channel 603. The TPC radio signal 612 is received and processed by the second receiver 607 to form a control signal 613, which is input to control the power level of the second transmitter 608. The transmitted data signal 609 is then controlled in its transmitted power.

Figure 2:
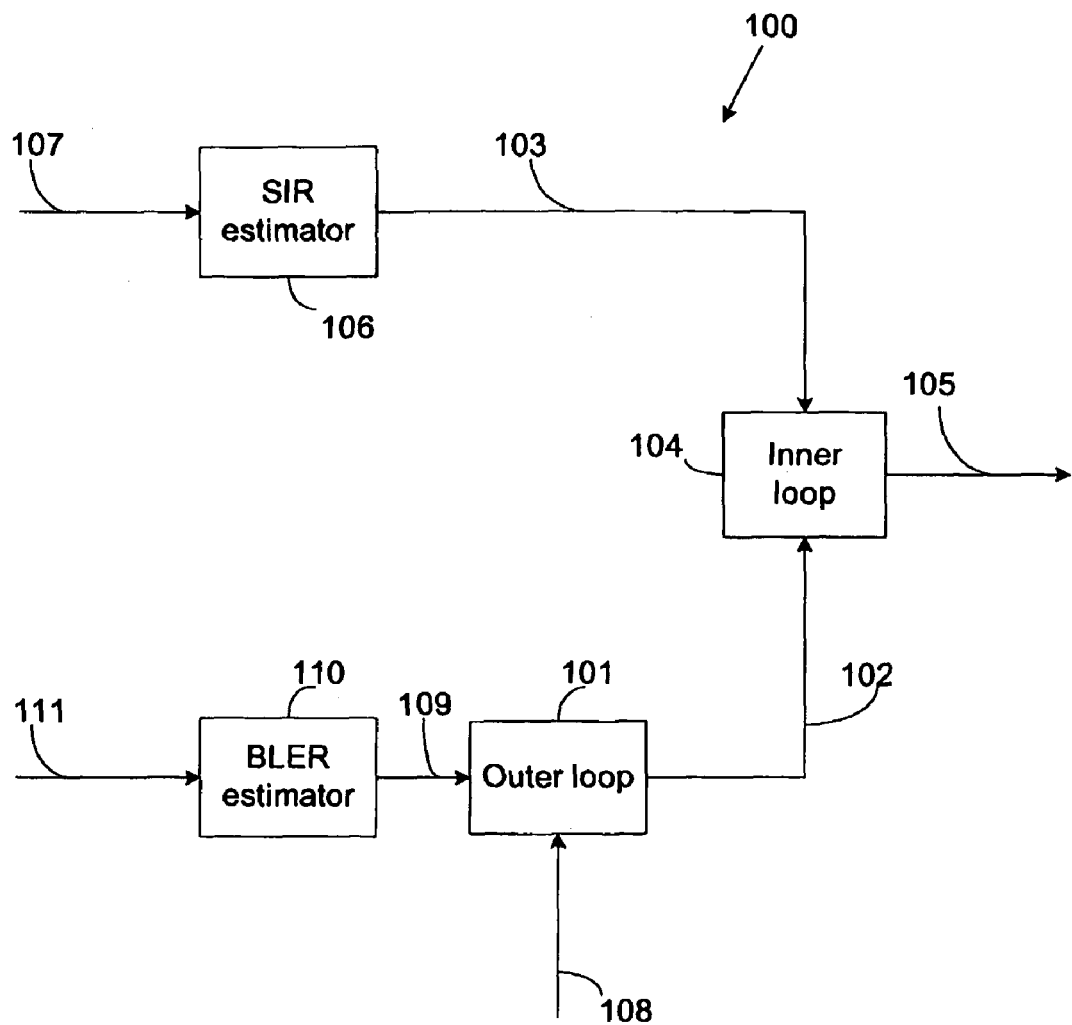
FIG. 2 illustrates a block diagram of a prior art power control unit in a 3GPP WCDMA wireless communication system.

FIG. 2 shows a schematic block diagram of a prior art power control unit 100 used in a transceiver of a device in a WCDMA wireless communication system based on the 3GPP specification, where power control typically is supported in both uplink and downlink propagation directions. The power control unit 100 will be associated with a receiver of the base station for the uplink power control and with a receiver of the mobile station for the downlink power control.

The purpose of the outer power control loop in a device in the wireless communication system is to set and continuously adjust a reference value for a signal quality measure for the inner power control loop to aim at. Typically, the quality measure value is a signal-to-interference ratio (SIR) value, and the quality measure reference value is a SIR reference value 102. A SIR estimator 106 generates a SIR estimate value 103 from received pilot symbols 107 and provides the SIR estimate value 103 to an inner loop element 104. Since the pilot symbols 107 are known at the receiver and have experienced the same propagation conditions on the wireless transmission channel as the information signal, the SIR value for the information signal may be estimated.

The inner power control loop element 104 affects a new SIR value by producing Transmit Power Control (TPC) commands 105 to be sent to another device (not shown) in the wireless communication system informing how that device should adjust its transmitted power. The transmitted power is typically adjusted in a predetermined manner. If the SIR estimate value 103 is below the SIR reference value 102, a TPC command 105 is sent to the transceiver of the other device to increase its power, and if the SIR estimate value 103 is above the SIR reference value 102, a TPC command 105 is sent to the transceiver of the other device to decrease its power. The transmitted power is typically adjusted in discrete steps in decibels (dB). The step size is network parameter configured by the wireless communication system and it is for WCDMA ±0.5; 1; 1.5 or 2 dB. A new TPC command 105 is sent every slot, which is every 10/15=0.667 ms, or equivalent: the inner loop 104 is working at a frequency of 1500 Hz to compensate for fast fading.

The SIR reference value 102 is generated and controlled by an outer control loop element 101 based on a Block Error Rate (BLER) reference value 108, which is a network parameter set by the wireless communication system, and an estimated BLER value 109, an additional quality measure for the received blocks of data. A BLER estimator 110 bases its estimation for the estimated BLER value for a transport channel on Cyclic Redundancy Check (CRC) error bits on each block of data. These bits have special coding properties, such that if they are found to be in error, the bits in the transport block are considered decoded in error by the receiver. The receiver processes the CRC error bits and forms a CRC error flag 111. If this flag is in a state of "not set", it is assumed that it will be possible to correctly recover the block of data in the receiver. Otherwise, if the flag is "set" the whole block of data is considered to be erroneous. The estimated BLER value for a transport channel is found by processing the CRC error flags 111 in the BLER estimator 110.

The outer control loop element 101 updates the SIR reference value 102 once every Transmission Time Interval (TTI), which is 10-80 ms for the 3GPP WCDMA system. A transport or code block comprises a number (1-8) of frames (each of 10 ms duration) transmitted during a TTI. The outer loop operates thus much slower than the inner loop, which instead updates the TPC command 105 every slot (0.667 ms).

Figure 3:
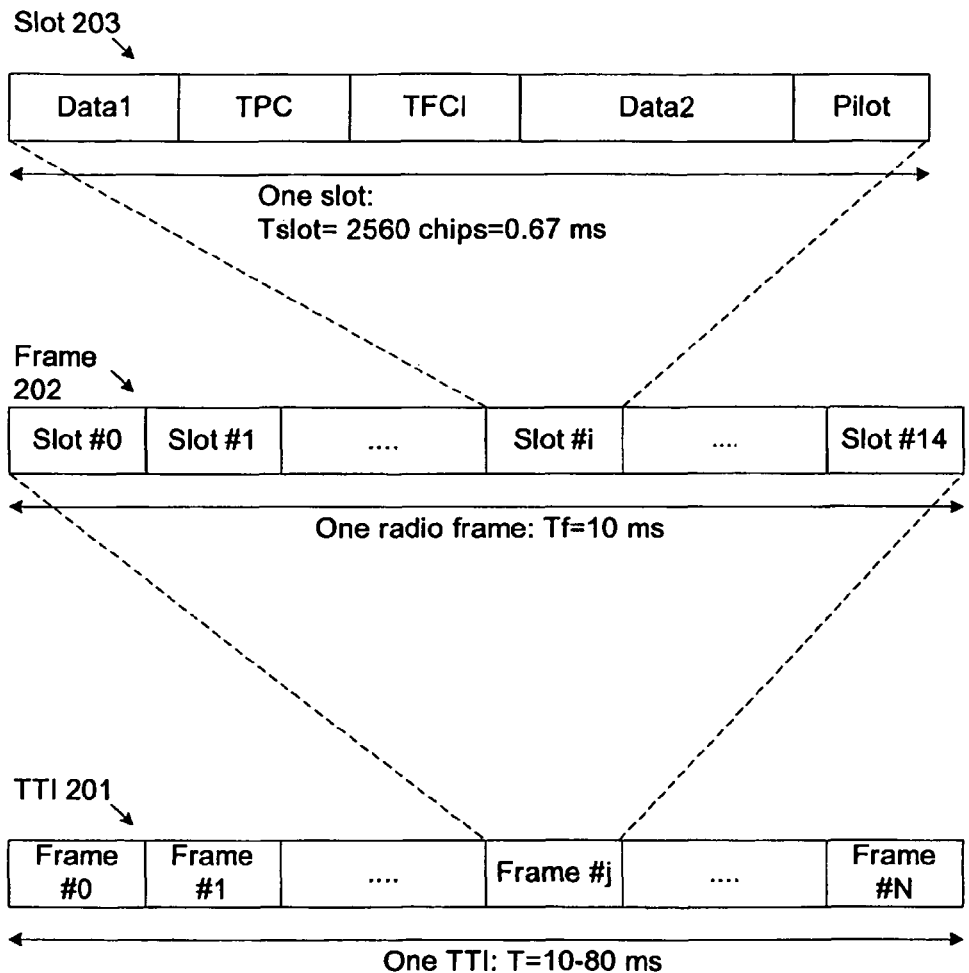
FIG. 3 illustrates a timing structure in a 3GPP WCDMA wireless communication system.

In FIG. 3, a typical timing structure in a WCDMA system is illustrated. A TTI 201 consists of 1 up to 8 radio frames 202. Each frame 202 of 10 ms is split into 15 slots 203, each of length 2560 chips (0.26 μs per chip) or 10/15=0.667 ms in time. Each slot 203 corresponds to one power control period for the inner loop. For example, on the dedicated downlink physical WCDMA channel (DPCH) each slot 203 carries the data bits, the TPC command, the pilot bits and a Transport Channel Indicator (TPCI). The data and the pilot bits are encoded as symbols (not shown), each representing a number of bits. The total number of bits in a slot is determined by the WCDMA spreading factor (SF). The value of the SF is, for WCDMA, in the range of 2 to 512.

The main purpose of power control in a wireless communication system is typically to control the sent power from the transmitters, in such a way that a quality measure at a receiver is maintained at and follows a given reference value. Different systems may use different quality measures and combinations of different quality measures. In a WCDMA solution, the BLER reference value 108 may for example be updated every TTI, but in reality updating the BLER reference value 108 is done even less often. The SIR reference value 102 is in the prior art solutions typically kept constant for each TTI, which may be as long as 80 ms, depending on the number of frames per TTI. In reality the actual SIR value, and thus the SIR estimate value 103, varies during this time. This is due to the effects of fading, noise and other disturbances, which in turn depend on the relative movement of the receiver of one device and the transmitter of another device, which are usually difficult to fully compensate for by power control.

For this reason the TPC command 105 may be updated based on a SIR reference value 102 that is no longer the ideal reference value for the remaining time of the TTI. The BLER value is a measured or estimated quality measure and it depends, for a received transport block, on the SIR variations during a corresponding TTI. This means that the BLER value will vary between TTIs with the same SIR reference value, which may result in either too high BLER or unnecessarily high power requests from the transmitter, which in turn results in reduced system capacity, e.g. a reduced number of simultaneous users in the communication system.

One purpose of embodiments of the present invention is therefore to adjust the reference value for the quality measure taking these variations into account. This is achieved by computing an effective new quality measure value, which corresponds to a constant quality measure value resulting in the same BLER value. A quality measure reference value is further generated by a first controller in the outer loop element and input to a new second controller or regulator included in, or associated with, the outer loop element or the inner loop element. The quality measure reference value may for example be generated once every predefined time period, and is generated based on a regulation of the estimated BLER value towards the BLER reference value. The predefined time period may be a TTI or a certain number of TTIs. The second controller in turn generates a modified quality measure reference value a number of times during the predefined time period, such as once every sub period, e.g. once per slot, based on a difference between a calculated effective quality measure value and the original quality measure reference value (that was generated by the first controller). An effective quality measure value calculator, which may be included in, or associated with, the outer loop element or the inner loop element, derives the effective quality measure value, as will be described in detail below, based on the estimated quality measure value. The modified quality measure reference value and the estimated quality measure value are further input to a third controller, the inner loop element, which compares the modified quality measure reference value with the estimated quality measure value and generates a power control command once every sub period, in dependence of the comparison. The power control command indicates a required power adjustment for the signals of another transmitting wireless communication device.

For the sake of illustration we now refer to SIR as the quality measure for the inner loop element and BLER as an additional quality measure for the outer loop element, but it should be understood that the invention is not limited to this combination of quality measures. Bit error rate (BER) is another possible quality measure choice for the outer loop element for example.

The BLER value depends on the SIR values during a corresponding TTI. If the SIR value were to be constant there would be a relationship between the SIR value and the BLER value such that a higher SIR value would represent a lower BLER value and vice versa. However, the SIR value is in reality varying, but the receiver needs to maintain a constant (low) BLER. For example, when the SIR value is varying during a TTI it would be beneficial to compute, or predict, a value of a constant SIR that would correspond to a certain BLER. According to an embodiment of the present invention such a SIR value is computed to form an effective quality measure value, the effective SIR, denoted $\overline{SIR}$ in the following. Thus, obtaining a certain BLER value is equivalent to obtaining a certain desired effective SIR value. This effective SIR value is calculated based on a number of estimated SIR values during the current time period, for example a TTI. The value of $\overline{SIR}$ is updated each sub period, for example each slot. In one or more embodiments of the invention the SIR reference value is adjusted several times during a time period, i.e. several times during a TTI. A new modified SIR reference value is generated based on the certain effective SIR several times during the predefined time period, such as once every sub period, which may be for example a slot, or a fraction of a slot.

The $\overline{SIR}$ value may be an average value of the different SIR values during the duration of a TTI, which may e.g. be 1, 2, 4 or 8 frames. By predicting the $\overline{SIR}$ value and allowing the SIR reference value to be updated within the predefined time period, e.g. the TTI, the effects of varying SIR estimate values are taken into account in the power control system.

The $\overline{SIR}$ value may be defined and predicted or calculated in various ways. Examples of definitions are shown in equations 1, 2 and 3.

A Linear effective SIR, is a linear average and is defined by $$\overline{SIR} = \frac{1}{N}\sum_{k=1}^{N} SIR(k), \quad (1)$$

where N is the number of SIR values obtained during the predefined time period, for example during the TTI. N may thus also be equal to the number of sub periods comprised in the TTI. If for example a new SIR value is estimated every slot, N will be equal to the number of slots in the TTI, which for WCDMA is an integer between 1 and 8. It should be noted, however, that the $\overline{SIR}$ may be calculated for any sub period and N need thus not be the number of sub periods in the time period.

Alternatively, a Logarithmic effective SIR may be used. It is defined by $$10 \cdot \log \overline{SIR} = \frac{1}{N}\sum_{k=1}^{N} 10 \cdot \log SIR(k) \quad (2)$$

As yet another alternative, an Exponential effective SIR may be used, and it is defined by $$e^{-\overline{SIR}} = \frac{1}{N}\sum_{k=1}^{N} e^{-SIR(k)} \quad (3)$$

These definitions has empirically been found to map the effective SIR on to a BLER in slightly different ways, thus different implementations may use different definitions. The Linear effective SIR and the Logarithmic effective SIR have been found to be most useful, if the SIR variations are small, and in a range of low SIR values; whereas the Exponential effective SIR provides a low uncertainty mapping for larger SIR variations as well. Alternatively, different combinations of definitions may be used for calculating the effective SIR, based on the range of the estimated SIR values.

Figure 4:
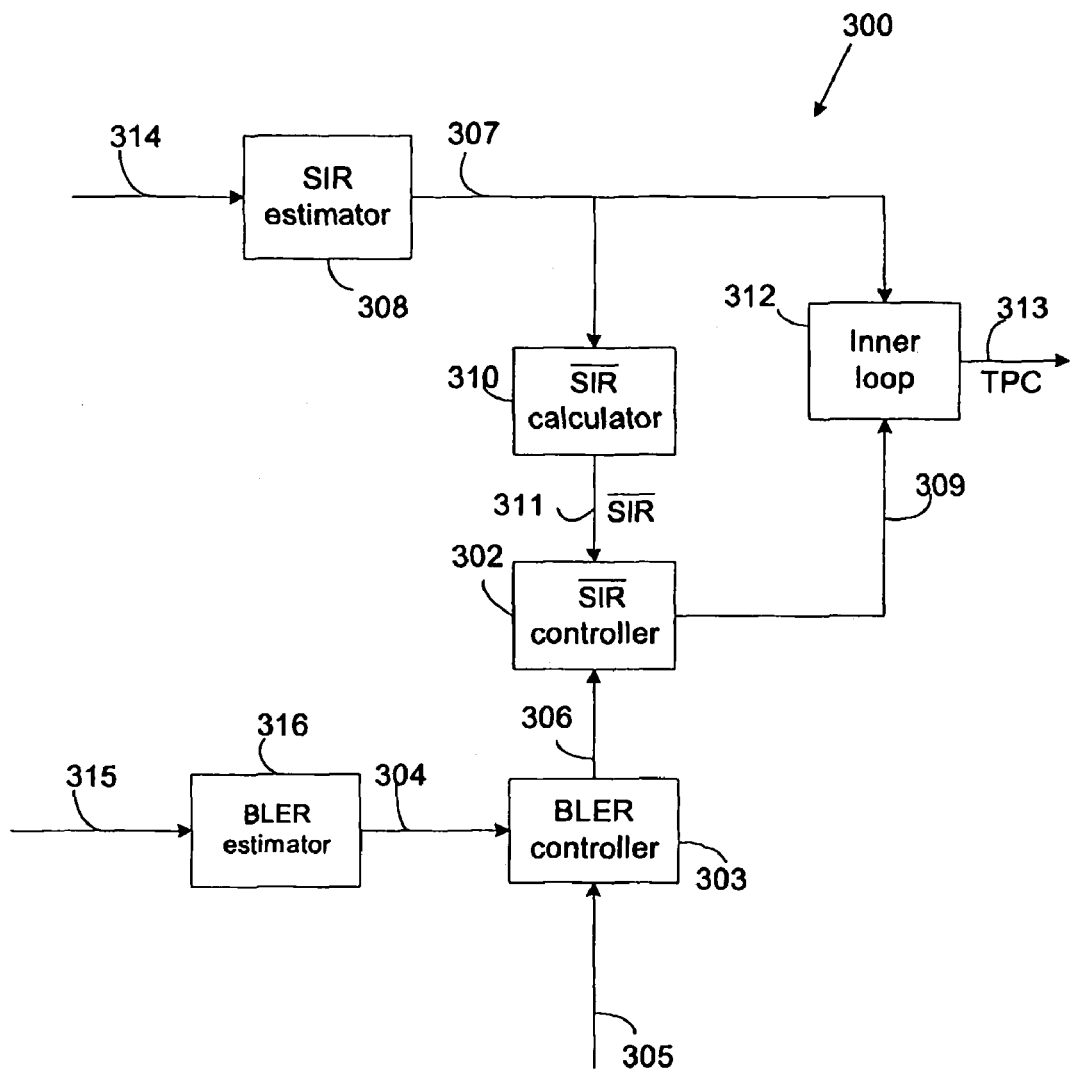
FIG. 4 illustrates a block diagram of a power control unit according to an embodiment of the present invention.

With reference now to FIG. 4, a block diagram of an example of a power control unit 300 according to one or more embodiments of the present invention is illustrated. A power control unit 300 that comprises a first controller 303, a second controller 302 and a third controller 312 is shown. The controllers may be realized for example as PI or PID regulators, although other regulators may be used. The power control unit 300 comprises a first controller 303, which may be a BLER controller (outer loop controller), which compares a BLER estimate value 304 (estimated in a BLER estimator 316 based on CRC error flags 315) with a BLER reference value 305 and generates a quality measure reference value, here denoted $\overline{SIR}$ reference value, 306 once every predefined time period, for example once per TTI. Compared to the prior art in FIG. 2, the power control unit 300 comprises an additional regulator element, the second controller 302, which may be a $\overline{SIR}$ controller. The $\overline{SIR}$ reference value 306 is input to the second controller, the $\overline{SIR}$ controller 302. Additionally, a SIR estimate value 307 is produced by the SIR estimator 308 based on received and processed pilot symbols 314, repeatedly during the TTI, such as once every sub period, for example once every slot. The SIR estimate value 307 is input to the third controller, an inner loop element 312. According to one or more embodiments of the invention, is the SIR estimate value 307 also input to a $\overline{SIR}$ calculator 310. The $\overline{SIR}$ calculator 310 calculates the effective SIR value, $\overline{SIR}$ 311, by for example any of the equations 1, 2 or 3, based on the SIR estimate value 307. The $\overline{SIR}$ 311 may be generated and updated once per sub period. The $\overline{SIR}$ calculator 310 and the second controller 302 may be included, or associated with either of the outer loop controller 303 or the inner loop element 312. The $\overline{SIR}$ value 311 is input to the $\overline{SIR}$ controller 302, which compares the $\overline{SIR}$ value 311 with the $\overline{SIR}$ reference value 306 and produces a modified SIR reference value 309. This is performed a number of times during the TTI, such as once per slot. This modified reference value is thus updated several times within the time period of a TTI. The modified SIR reference value 309 may be generated once every sub period and is the reference input to the third controller 104, the inner loop element. The purpose of the controlling performed by the $\overline{SIR}$ controller 302 is to minimize the error (effective $\overline{SIR}$ error) between the requested effective SIR value; which is the $\overline{SIR}$ reference value 306; and the actual effective SIR value 311, by updating the modified SIR reference value 309 several times during the predefined time period.

In the following, the terminology for a $\overline{SIR}$ reference value will be $\overline{SIR}_{ref}$ and for a modified SIR reference value, $SIR_{ref}$.

The $\overline{SIR}$ calculator 310 further needs to keep track of the timing, at which instant within the TTI the present $\overline{SIR}$ value relates to. The power control unit 300 may therefore be associated with a timer for registering an expiration of the predefined time period and registration of the sub periods. The timer is accordingly updated for keeping track of which sub period, of the N possible sub periods in the predefined time period, is being processed.

It should be understood that the illustration of FIG. 4 may or may not represent physical circuit implementations, depending for example on whether the power control unit 300 is implemented in hardware or software, or in some combination thereof. For example, in software-based implementation, the illustrated elements may comprise processing functions implemented by computer program instructions, or microcode, etc. stored on a non-transitory computer-readable medium.

An optimisation with respect to modified SIR reference values at each slot may be done over many TTIs. A weight on the modified SIR reference value may be included in the optimisation in order to keep the modified SIR reference value as small as possible.

In an example of an embodiment of the invention, the optimisation works to minimize the effective $\overline{SIR}$ error, and is performed by minimizing the absolute effective $\overline{SIR}$ error over M TTI time periods. This error is shown in equation 4:

$$\overline{SIR}_{error} = \sum_{m=1}^{M} |\overline{SIR}_{ref}(m) - \overline{SIR}(m)| \quad (4)$$

A new optimal selection, according to the above criteria, of a modified SIR reference value may be computed every time a new SIR measurement or estimation is made, that is, each sub period, for example once every slot.

In the optimisation several considerations need to be taken into account, such as the dynamics between the modified SIR reference value and actual SIR value and such as limitations and constraints on the SIR value and the rate of change of the SIR values. For example, in a WCDMA system, there are limitations such as allowed power step sizes and how often to change the SIR value. In WCDMA it is only possible to change a SIR reference value between consecutive slots. The power is decreased or increased in fixed steps of usually 1 dB.

In another embodiment of the invention, an optimisation is performed considering only the current TTI(M=1) and with respect to the remaining modified SIR reference values of that TTI at a specific sub period in the time period, $$SIR_{ref}(n+1), \ldots, SIR_{ref}(N), \quad (5)$$

for N−n remaining modified SIR reference values, where N is the total number of SIR values during a time period, for example a TTI. At the end of a TTI, when running out of time to obtain the correct effective SIR, the optimal values of the modified SIR reference 309 will, typically, deviate more from the original SIR reference value 306. The final modified SIR reference value, $SIR_{ref}(N)$, may be far from the original SIR reference value, the $\overline{SIR}$ reference value 306. This may cause a control problem for the subsequent TTI since instant changes of the SIR value are prevented by dynamics. Therefore, in yet another embodiment of the invention a suitable weight or constraint is placed on the final modified SIR reference value to improve the performance of the control loop for subsequent transmission time intervals.

The solutions presented above result in time-varying control algorithms, but time-invariant control algorithms may also be considered.

Now a discussion in greater detail will be given for an example of an embodiment of a control algorithm for the $\overline{SIR}$ controller 302. This algorithm may be realized with low complexity for the solution when considering only a current TTI (M=1) and with respect to the remaining modified SIR reference values of that TTI. If we assume that there is a new SIR reference value estimated every sub period, which may for example be a slot of a TTI, and that for (at a specific slot number; n) the remaining slots of the predefined time period, such as the TTI, it is possible to obtain $SIR(n)=SIR_{ref}(n)$; then it will be possible with instantaneous changes of the SIR value. Then the optimisation may be done for each TTI individually.

Again, the terminology for a $\overline{SIR}$ reference value 306 will be $\overline{SIR}_{ref}$ and for a SIR reference value 309, $SIR_{ref}$.

Figure 5A:
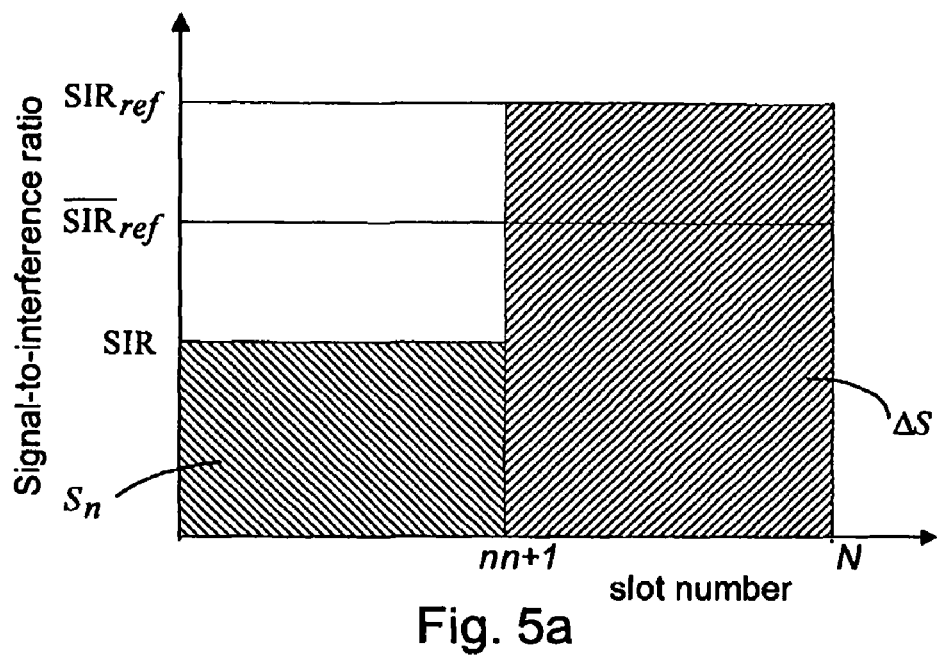
FIG. 5a shows a graphic illustration of SIR values; SIR reference values and effective SIR reference value versus time, obtained by embodiments of the invention.
Figure 5B:
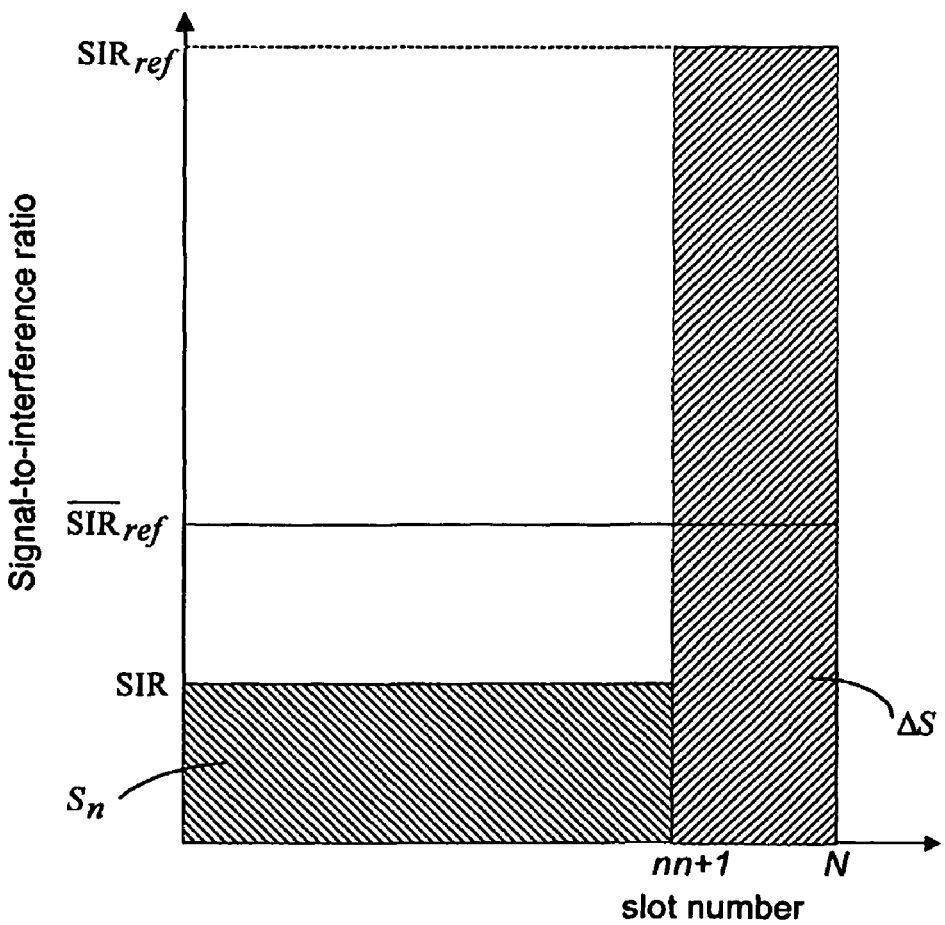
FIG. 5b shows an alternative graphic illustration of SIR values; SIR reference values and effective SIR reference value versus time, obtained by embodiments of the invention.

FIG. 5a and FIG. 5b shows two examples of graphic illustrations of the criteria behind how to choose the modified SIR reference value at the slot number n+1, based on information up to slot number n. For illustration purposes the SIR values are drawn as unrealistic straight lines. At n, the modified SIR reference value needs to be chosen so that a goal for the $\overline{SIR}$ controller 302 is fulfilled; the goal being to produce $SIR_{ref}$ values to obtain the same area, equal to $N \cdot SIR_{ref}$, below a $SIR_{ref}$ curve and a SIR curve during N sub periods of the time period.

To obtain this goal, a value for the remaining modified SIR reference values, hereafter denoted $\Delta S(n+1)$, needs to be chosen at slot number n+1, where n+1={1 ... N}, such that $$\Delta S(n+1) = N \cdot \overline{SIR}_{ref} - S_n, \quad (6a)$$

where $S_n$ is the contribution to the area from n SIR values, an accumulated SIR value, and $\Delta S(n+1)$ is the contribution of the area from the remaining N−n SIR reference values yet to be obtained. FIG. 5a and FIG. 5b illustrate two scenarios of SIR contribution to the area at slot number n. $S_n$ is for example calculated by one of equations 1-3. The $\overline{SIR}_{ref}$ value was obtained by the comparison of the estimated BLER value with the BLER reference value in the BLER controller. FIG. 5b shows a situation when a larger $\Delta S(n+1)$ is required compared with the situation in FIG. 5a.

If the value of $\Delta S(n+1)$ at slot number n+1 becomes zero or negative, the modified signal-to-interference ratio reference value needs to be set at a predetermined threshold value for the remaining time of the time period. The threshold value could for example be set to zero.

If the Linear effective SIR is used as the $\overline{SIR}$ definition, the remaining modified SIR reference values, i.e. $\Delta S(n+1)$, should be chosen such that $$N \cdot \overline{SIR}_{ref} = \sum_{k=1}^{N} SIR(k) + \sum_{k=n+1}^{N} SIR_{ref}(k) \quad (6b)$$

will be fulfilled.

The first part of the right-hand side of equation 6b is then equal to a definition of $S_n$ with Linear effective SIR and the second part is equal to the design choice of $\Delta S(n+1)$.

Equation 6b may be rewritten as $$\sum_{k=1}^{N} (\overline{SIR}_{ref} - SIR(k)) + \sum_{k=n+1}^{N} (\overline{SIR}_{ref} - SIR_{ref}(k)) = 0 \quad (7)$$

If all remaining modified SIR reference values are chosen to be equal, the smallest variance in the actual SIR is obtained. This means that the modified new SIR reference value at the next instant in time, at slot n+1, should be chosen such that $$SIR_{ref}(n+1) = \overline{SIR}_{ref} + K_i \sum_{k=1}^{n} (\overline{SIR}_{ref} - SIR_{ref}(k)), \; K_i = \frac{1}{N-n} \quad (8)$$

Equation 8 may be expressed in terms of the definitions in equation 6a as $$SIR_{ref}(n+1) = \frac{\Delta S(n+1)}{N-n} = K_i \cdot \Delta S(n+1) \quad (9)$$

Alternatively, using the Exponential effective SIR instead, the smallest SIR variance is obtained if the modified new SIR reference value is chosen such that $$e^{-SIR_{ref}(n+1)} = e^{-\overline{SIR}_{ref}} + K_i \sum_{k=1}^{n} (e^{-\overline{SIR}_{ref}} - e^{-SIR(k)}), \quad (10)$$

$$K_i = \frac{1}{N-n}$$

Here the corresponding $S_n$-definition is:

$$S_n = \sum_{k=1}^{n} e^{-SIR(k)},$$

and $\Delta S(n+1) = N \cdot e^{-\overline{SIR}_{ref}} - S_n$, which may then be designed to be $$\Delta S(n+1) = \sum_{k=n+1}^{N} e^{-SIR_{ref}(k)}.$$

Yet an alternative equation for a modified new SIR reference value to be obtained at n+1 is shown in Equation 1, when based on the Logarithmic effective SIR:

$$\log SIR_{ref}(n+1) = \log \overline{SIR}_{ref} + K_i \sum_{k=1}^{n} \left( \frac{\log \overline{SIR}_{ref} -}{\log SIR(k)} \right), \quad (11)$$

$$K_i = \frac{1}{N-n}$$

Here the corresponding definitions become $$S_n = \sum_{k=1}^{n} \log(SIR(k)) \text{ and } \Delta S(n+1) = N \cdot \log(\overline{SIR}_{ref}) - S_n,$$

where $\Delta S(n+1)$ may be designed as $$\Delta S(n+1) = \sum_{k=n+1}^{N} \log(SIR_{ref}(k)).$$

The factor $K_i$ is a constant that determines the number of slots during which an incorrect effective SIR may be corrected. The correction may be spread out for a number of slots. Correction during one slot corresponds to $K_i=1$, i.e. all correction is performed once only, and correction during a fixed number of slots corresponds to a constant $K_i \leq 1$. Calculation of $SIR_{ref}$ for the next slot, n+1, is performed on the estimated SIR and $\overline{SIR}_{ref}$ for the previous slots.

A negative modified SIR reference value corresponds to a situation where there is knowledge of the system that the effective SIR value for the current TTI will be high enough. Then the transmitter may turn off its power resulting in a zero SIR value.

Figure 6:
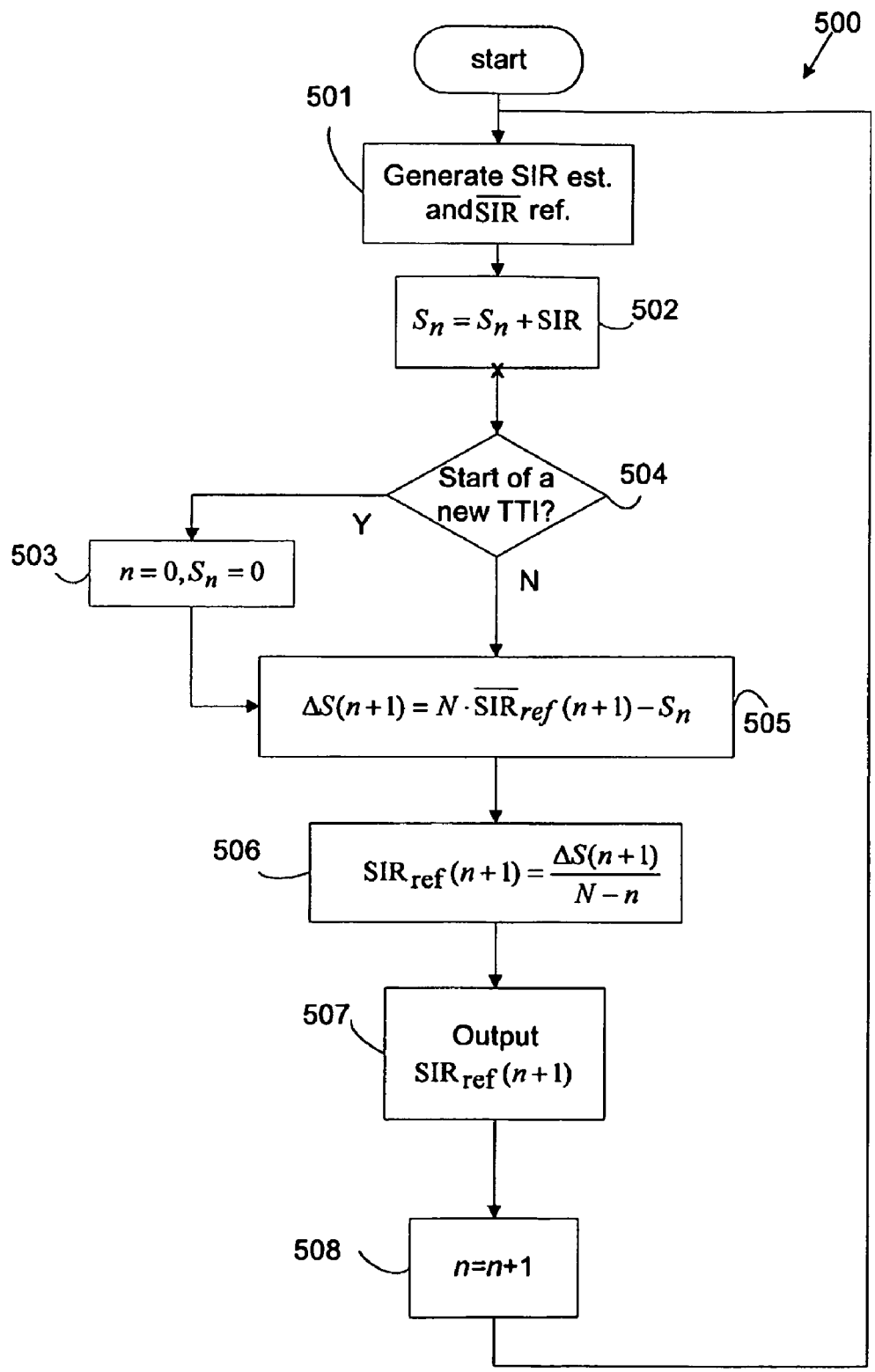
FIG. 6 is an example of a flow diagram of the SIR reference regulation performed by an outer control loop according to an embodiment of the present invention.

FIG. 6 is a flow diagram that illustrates an example of a method 500 for determining a modified SIR reference value at a slot n+1 by use of an effective SIR value. In the following the example of the linear effective SIR is used. The sub period is within the predefined time period and method 500 runs once every sub period for all N sub periods within the predefined time period. In the following, the sub period is assumed to be a slot and the predefined time period is a TTI in a WCDMA wireless system, however the time periods of the present invention are not limited to these time periods.

At step 501, a SIR estimate value is generated based on received pilot symbols and the estimate is input to the $\overline{SIR}$ calculator at a slot n. Further a $\overline{SIR}$ reference value, which has been generated by the BLER controller based on the BLER reference value and the estimated BLER value, is input to the SIR controller. Then the method proceeds to step 502, in which the $\overline{SIR}$ calculator updates an accumulated SIR value, $S_n$, with the current estimated SIR value. $S_n$ is the $\overline{SIR}$ based on slot number 1 ... n. $S_n$ is input to the $\overline{SIR}$ controller and then the method proceeds with step 504. At step 504, a check is made if it is the start of a new TTI. If n=N the previous TTI has just finished, thus a new TTI is at hand. If this is the case, the accumulated SIR value, $S_n$ and n are set to zero at an initialisation step 503. If in step 504 it was found that we are not at the beginning of a new TTI, $\Delta S(N+1)$ is calculated according to equation 6a at step 505. It may graphically be viewed as the right-most area in any of the graphs in FIG. 5a or FIG. 5b. This area illustrates the remaining modified SIR reference values times the time left of the TTI. Then at step 506, the modified SIR reference value, valid for slot number n+1, is generated by the $\overline{SIR}$ controller according to any of equations 8, 9, 10 or 11, depending on which definition of the effective SIR was used.

The modified SIR reference value is then output from the $\overline{SIR}$ controller and input to the inner loop controller at step 507. Then the time slot number n is updated at step 508. Then the process starts over at step 501. This modified SIR reference value is now assumed to be valid for all remaining slots up to N, however in the next run the modified SIR reference value is updated again with a new value. The process thus runs though a whole TTI with a new update of the modified SIR reference value every slot.

In reality, instantaneous changes in the modified SIR reference value are, as discussed previously, not utilized, but instead the modified SIR reference value will need to be changed by a fixed step, by for example 1 dB. When approaching the end of a TTI, with a limited amount of time left to reach the wanted level of the $\overline{SIR}$ reference value, there may be problem of unwanted large variations up and down in the SIR value. Thus, there may be a need to fulfil an end condition with a set final value constraint.

So, in yet another embodiment of the invention, a final value constraint for the SIR value needs to be fulfilled, as will be discussed in greater detail below. Here the Logarithmic effective SIR, as defined by equation 2, is used for illustration.

Keeping the current modified SIR reference value until getting close to the end of the TTI, and then ramping it (stepwise) to the correct value, i.e. the $\overline{SIR}$ reference value, provided that the SIR value is equal to the SIR reference value, results in the following contribution to the effective SIR, A(n):

$$A(n) = (N - n) \cdot SIR_{ref}^{dB}(n) + \qquad (12)$$
$$\frac{\overline{SIR}_{ref}^{dB} - SIR_{ref}^{dB}(n)}{2} \left( 1 + \frac{|\overline{SIR}_{ref}^{dB} - SIR_{ref}^{dB}(n)|}{SIR_{step}^{dB}} \right),$$

where $SIR_{step}^{dB}$ is the SIR step size in decibels (dB) and where the first part of the right hand side of equation 12 is analogous to the area below a SIR-vs.-time curve without the ramping, and the second part is the area contribution from the ramping part. A(n) is thus measured in decibels (dB).

Either an increase or a decrease in the modified SIR reference value is performed depending on whether the expected contribution is too small or too large.

This leads to a modified SIR reference value (in decibels) for the next time slot, n+1, which equals $$SIR_{ref}^{dB}(n+1) = SIR_{ref}^{dB}(n) + \text{sign}\left( \frac{N \cdot \overline{SIR}_{ref}^{dB} -}{\sum_{k=1}^{n} SIR_{ref}^{dB}(k) - A(n)} \right) \cdot SIR_{step}^{dB} \qquad (13)$$

An end condition, when n is approaching N, needs to be satisfied and is given by the inequality $$\left|\overline{SIR}_{ref}^{dB} - SIR_{ref}^{dB}(n+1)\right| < (N-n) \cdot SIR_{step}^{dB} \quad (14)$$

By approximations a simplified algorithm of equation 12 may for example be written as $$A(n) \approx \left(N - n - \frac{n_{ramp}}{2}\right) \cdot SIR_{ref}^{dB}(n), \quad (15)$$

where $n_{ramp}$ are an assumed average or typical number of steps needed by the ramp at the end of a TTI. In this embodiment there will thus be a compromise between the wanted area and the last modified SIR reference value. If the modified SIR reference value is to be at the level of the $\overline{SIR}$ reference value at the last slot of a TTI, in order to have an optimal starting value for the start of the next TTI, then the ramping down or up at the end may result in the total area slightly different from the intended, optimal, area.

In yet another alternative embodiment, the invention may further increase system capacity if it is utilized in a way that power is saved. Due to coding it may be possible to predict the success of a current transmission of a block before all the bits of the coded block have been received. The decoder may for example be able to reconstruct the full block before all the bits have been received. Then it is possible to reduce the power, or equivalently the SIR value, during the remaining part of the TTI. This is possible due to the fact that the quality of the remaining bits will not have influence on the success of the current block reception. This will decrease the power needed and thus increase system capacity.

In yet another embodiment, an effective SIR value may be used as an additional net planning parameter utilized by the base stations. Then the SIR value associated with a certain mobile unit may be increased during parts of the TTI and decreased for other parts of the TTI provided that the effective SIR value, and thus the BLER value, is the same. This way of scheduling the transmitted power from each mobile unit in the system, also improves system capacity.

With reference again to FIG. 1, a power control system is schematically shown in which the power control algorithms according to embodiments of the invention would operate. The at least one power control unit 606, may for example be the power control unit 300 described above in relation to FIG. 4.

Although embodiments of the present invention have been described and shown, the invention is not restricted to them, but may also be embodied in other ways within the scope of the subject matter defined in the following claims. For example, while the embodiments of the invention have been described with respect to WCDMA, the invention is not limited thereto but may certainly be applicable to other wireless communication systems and combinations of different wireless communication systems. Further, the power control method may be supported in both uplink and downlink.

The term "transceiver" used in this specification includes various kinds of mobile communication units present in a mobile communication system. Also the present invention is not limited to single-band or single-mode transceivers, but includes transceivers serving more than one wireless communication system.

The terms "mobile unit" or "mobile station" used in this specification include various kinds of portable or wireless communication equipment, such as mobile telephones, pagers, electronic organizers, smart phones, communicators, headsets and other communication apparatus.

The invention claimed is:

1. A method for generating a power control command in a transceiver in a wireless communication system, the method comprising calculating, at the beginning of a predefined time period, a quality measure reference value;

generating, repeatedly during the predefined time period, an estimated quality measure value of a signal received at the transceiver;

calculating, at a given point in time during the predefined time period, an effective quality measure value from estimated quality measure values previously generated;

generating, a number of times during the predefined time period, a modified quality measure reference value in dependence of a difference between the effective quality measure value and said quality measure reference value;

generating a plurality of power control commands during the predefined time period by, for each of the modified quality measure reference values generated during the predefined time period, comparing the estimated quality measure value with the modified quality measure reference value; and resetting, at the beginning of a next predefined time period, the modified quality measure reference value to the quality measure reference value, wherein:

the predefined time period is divided into a number of sub periods; and the method further comprises generating the modified quality measure reference value as a predetermined threshold value for a remaining time of the predefined time period, if a value of the modified quality measure reference value for a given next sub period becomes zero or negative.

2. The method according to claim 1, wherein the step of calculating the effective quality measure value comprises calculating at least one of a linear average, an exponential average and a logarithmic average from the estimated quality measure values previously generated.

3. The method according to claim 1, wherein the estimated quality measure value is an estimated signal-to-interference ratio value; and the quality measure reference value is a signal-to-interference ratio reference value.

4. The method according to claim 3, wherein the predefined time period is divided into a number of sub periods; and wherein the step of generating the modified signal-to-interference ratio reference value for a given sub period, n+1, comprises calculating $$SIR_{ref}(n+1) = \overline{SIR}_{ref} + K_i \sum_{k=1}^{n} (\overline{SIR}_{ref} - SIR(k)),$$

where $SIR_{ref}$ is the modified signal-to-interference ratio reference value, $\overline{SIR}_{ref}$ is the signal-to-interference ratio reference value, $K_i$ is a constant and $SIR(k)$ is the estimated signal-to-interference ratio value for the k:th sub period.

5. The method according to claim 4, wherein $K_i=1/(N-n)$; where N is a number of sub periods in the predefined time period and n is a present sub period number.

6. The method according to claim 4 wherein the step of generating the modified signal-to-interference ratio reference value further comprises setting the modified signal-to-interference ratio reference value to a predetermined threshold value for a remaining time of the predefined time period, if the value of SIR $_{ref}$(n+1) becomes zero or negative.

7. The method according to claim 6, wherein the predetermined threshold value is set to zero.

8. The method according to claim 4, wherein the sub period is a slot in a wideband code division multiple access system.

9. The method according to claim 4, wherein the sub period is a fraction of a slot in a wideband code division multiple access system.

10. The method according to claim 3, wherein the predefined time period is divided into a number of sub periods; and wherein the step of generating the modified signal-to-interference ratio reference value for a given sub period, n+1, comprises calculating $$e^{-SIR_{ref}(n+1)} = e^{-\overline{SIR}_{ref}} + K_i \sum_{k=1}^{n}(e^{-\overline{SIR}_{ref}} - e^{-SIR(k)}),$$

where $SIR_{ref}$ is the modified signal-to-interference ratio reference value, $\overline{SIR}_{ref}$ is the signal-to-interference ratio reference value, $K_i$ is a constant and SIR(k) is the estimated signal-to-interference ratio value for the k:th sub period.

11. The method according to claim 3, wherein the step of generating the modified signal-to-interference ratio reference value for a given sub period, n+1, comprises calculating $$\log SIR_{ref}(n+1) = \log\overline{SIR}_{ref} + K_i \sum_{k=1}^{n}(\log\overline{SIR}_{ref} - \log SIR(k)),$$

where $SIR_{ref}$ is the modified signal-to-interference ratio reference value, $\overline{SIR}_{ref}$ is the signal-to-interference ratio reference value, $K_i$ is a constant and SIR(k) is the estimated signal-to-interference ratio value for the k:th sub period.

12. The method according to claim 1, wherein the step of generating the modified quality measure reference value comprises setting the modified quality measure reference value to a maximum value for a first part of the predefined time period and a minimum value for a second part of the predefined time period.

13. The method according to claim 1, wherein the wireless communication system is a wideband code division multiple access system.

14. The method according to claim 1, wherein the predefined time period is at least one transmission time interval in a wideband code division multiple access system.

15. The method according to claim 1, wherein the transceiver is a mobile station.

16. The method according to claim 1, wherein the transceiver is a base station.

17. A power control unit for use in a wireless communication transceiver, the power control unit comprising a first controller configured to calculate, at the beginning of a predefined time period, a quality measure reference value;

a quality measure estimator configured to generate, repeatedly during the predefined time period, an estimated quality measure value of a signal received at the transceiver;

a calculator configured to calculate, at a given point in time during the predefined time period, an effective quality measure value from estimated quality measure values previously generated;

a second controller configured to generate, a number of times during the predefined time period, a modified quality measure reference value in dependence of a difference between the effective quality measure value and said quality measure reference value; and an inner loop element configured to generate a plurality of power control commands during the predefined time period by, for each of the modified quality measure reference values generated during the predefined time period, comparing the estimated quality measure value with the modified quality measure reference value, wherein the power control unit is configured to reset, at the beginning of a next predefined time period, the modified quality measure reference value to the quality measure reference value, wherein:
the predefined time period is divided into a number of sub periods; and
the second controller further is configured to generate the modified quality measure reference value as a predetermined threshold value for a remaining time of the predefined time period, if a value of the modified quality measure reference value for a given next sub period becomes zero or negative.

18. The power control unit according to claim 17, wherein the calculator is configured to generate the effective quality measure value by calculating at least one of a linear average, an exponential average and a logarithmic average of the estimated quality measure values previously generated.

19. The power control unit according to claim 17 wherein the estimated quality measure value is an estimated signal-to-interference ratio value, and the quality measure reference value is a signal-to-interference ratio reference value.

20. The power control unit according to claim 19, wherein the predefined time period is divided into a number of sub periods; and wherein the second controller is configured to generate the modified signal-to-interference ratio reference value for a given sub period, n+1, by calculating $$SIR_{ref}(n+1) = \overline{SIR}_{ref} + K_i \sum_{k=1}^{n}(\overline{SIR}_{ref} - SIR(k)),$$

where $SIR_{ref}$ is the modified signal-to-interference ratio reference value, $\overline{SIR}_{ref}$ is the signal-to-interference ratio reference value, $K_i$ is a constant and SIR(k) is the estimated signal-to-interference ratio value for the k:th sub period.

21. The power control unit according to claim 20 wherein $K_i=1/(N-n)$,
where N is a number of sub periods in the predefined time period and n is a present sub period number.

22. The power control unit according to claim 20, wherein the sub period is a slot in a wideband code division multiple access system.

23. The power control unit according to claim 20, wherein the sub period is a fraction of a slot in a wideband code division multiple access system.

24. The power control unit according to claim 19, wherein the predefined time period is divided into a number of sub periods; and wherein the second controller is configured to generate the modified signal-to-interference ratio reference value for a given sub period, n+1, by calculating $$e^{-SIR_{ref}(n+1)} = e^{-\overline{SIR}_{ref}} + K_i \sum_{k=1}^{n} (e^{-\overline{SIR}_{ref}} - e^{-SIR(k)}),$$

where $SIR_{ref}$ is the modified signal-to-interference ratio reference value, $\overline{SIR}_{ref}$ is the signal-to-interference ratio reference value, $K_i$ is a constant and $SIR(k)$ is the estimated signal-to-interference ratio value for the k:th sub period.

25. The power control unit according to claim 19, wherein the predefined time period is divided into a number of sub periods; and wherein the second controller is configured to generate the modified signal-to-interference ratio reference value for a given sub period, n+1, by calculating $$\log SIR_{ref}(n+1) = \log \overline{SIR}_{ref} + K_i \sum_{k=1}^{n} (\log \overline{SIR}_{ref} - \log SIR(k)),$$

where $SIR_{ref}$ is the modified signal-to-interference ratio reference value, $\overline{SIR}_{ref}$ is the signal-to-interference ratio reference value, $K_i$ is a constant and $SIR(k)$ is the estimated signal-to-interference ratio value for the k:th sub period.

26. The power control unit according to claim 19, wherein:
the modified quality measure reference value is a modified signal-to-interference ratio reference value;
the predefined time period is divided into a number of sub periods; and
the second controller further is configured to generate the modified signal-to-interference ratio reference value as a predetermined threshold value for a remaining time of the predefined time period, if a value of $SIR_{ref}$ (n+1) becomes zero or negative,
where:
$SIR_{ref}$ (n+1) is the modified signal-to-interference ratio reference value for a given sub period n+1.

27. The power control unit according to claim 26, wherein the predetermined threshold value is set to zero.

28. The power control unit according to claim 17, wherein the predefined time period is at least one transmission time interval in a wideband code division multiple access system.

29. A wireless communication transceiver comprising a power control unit according to claim 17.

30. The wireless communication transceiver according to claim 29, wherein the wireless communication transceiver is a mobile station in a wireless communication system.

31. The wireless communication transceiver according to claim 29, wherein the wireless communication transceiver is a base station in a wireless communication system.

32. A non-transitory computer readable medium having stored thereon program code for performing a method when said program code is run on a computer processor, said method comprising:
calculating, at the beginning of a predefined time period, a quality measure reference value;
generating, repeatedly during the predefined time period, an estimated quality measure value of a signal received at the transceiver;
calculating, at a given point in time during the predefined time period, an effective quality measure value from estimated quality measure values previously generated;
generating, a number of times during the predefined time period, a modified quality measure reference value in dependence of a difference between the effective quality measure value and said quality measure reference value;
generating a plurality of power control commands during the predefined time period by, for each of the modified quality measure reference values generated during the predefined time period, comparing the estimated quality measure value with the modified quality measure reference value; and
resetting, at the beginning of a next predefined time period, the modified quality measure reference value to the quality measure reference value,
wherein:
the predefined time period is divided into a number of sub periods; and
the method further comprises generating the modified quality measure reference value as a predetermined threshold value for a remaining time of the predefined time period, if a value of the modified quality measure reference value for a given next sub period becomes zero or negative.

* * * * *

UNITED STATES PATENT AND TRADEMARK OFFICE
CERTIFICATE OF CORRECTION

| | | |
|---|---|---|
| PATENT NO. | : 8,036,694 B2 | Page 1 of 1 |
| APPLICATION NO. | : 11/721795 | |
| DATED | : October 11, 2011 | |
| INVENTOR(S) | : Andersson et al. | |

It is certified that error appears in the above-identified patent and that said Letters Patent is hereby corrected as shown below:

In Column 11, Line 36, delete "number; n)" and insert -- number, n) --, therefor.

In Column 13, Line 9, delete "Equation 1," and insert -- Equation 11, --, therefor.

Signed and Sealed this
Fourteenth Day of February, 2012

David J. Kappos
*Director of the United States Patent and Trademark Office*